United States Patent
Gramme et al.

(10) Patent No.: US 7,611,633 B2
(45) Date of Patent: Nov. 3, 2009

(54) METHOD AND DEVICE FOR SEPARATION OF A FLUID, IN PARTICULAR OIL, GAS AND WATER

(75) Inventors: Per Gramme, Porsgrunn (NO); Gunnar Hannibal Lie, Porsgrunn (NO)

(73) Assignee: Norsk Hydro ASA, Oslo (NO)

( * ) Notice: Subject to any disclaimer, the term of this patent is extended or adjusted under 35 U.S.C. 154(b) by 431 days.

(21) Appl. No.: 10/563,358

(22) PCT Filed: Jul. 8, 2004

(86) PCT No.: PCT/NO2004/000212

§ 371 (c)(1),
(2), (4) Date: May 25, 2006

(87) PCT Pub. No.: WO2005/005776

PCT Pub. Date: Jan. 20, 2005

(65) Prior Publication Data

US 2007/0017875 A1    Jan. 25, 2007

(30) Foreign Application Priority Data

Jul. 9, 2003    (NO) .................................. 20033152

(51) Int. Cl.
*B01D 17/05*    (2006.01)

(52) U.S. Cl. ................. 210/708; 166/267; 210/712; 210/738; 210/747

(58) Field of Classification Search ................ 210/708
See application file for complete search history.

(56) References Cited

U.S. PATENT DOCUMENTS

| | | | |
|---|---|---|---|
| 1,617,739 A * | 2/1927 | Averill | 516/139 |
| 3,560,371 A * | 2/1971 | Kaminsky | 208/391 |
| 3,928,194 A | 12/1975 | Tao | |
| 3,977,469 A * | 8/1976 | Broussard et al. | 166/266 |
| 4,481,130 A | 11/1984 | Robertson | |
| 5,841,055 A | 11/1998 | Hooper et al. | |
| 6,056,882 A | 5/2000 | Scalliet | |
| 6,277,286 B1 * | 8/2001 | Sontvedt et al. | 166/250.03 |
| 7,278,543 B2 * | 10/2007 | Sagatun et al. | 210/519 |
| 7,404,903 B2 * | 7/2008 | Bozak et al. | 210/708 |

FOREIGN PATENT DOCUMENTS

WO    01/45818    6/2001

\* cited by examiner

*Primary Examiner*—Peter A Hruskoci
(74) *Attorney, Agent, or Firm*—Wenderoth, Lind & Ponack, L.L.P.

(57) ABSTRACT

A method for separation of fluid, in particular oil, gas and water, in connection with the extraction of such a fluid from formations under the surface of the earth or the sea bed. The fluid is transported in a supply pipe or transport pipe (4) to a separator (1) in the form of a tubular separator body, a gravitation tank or similar. The separated components, water and oil, are passed out of the separator separately via outlet pipes. The fluid upstream of the separator (1) is subjected to shear forces so that the drops in the supply flow are torn up to form drops that are so small that the interface generally becomes new and "uncontaminated" by surfactants. The shear forces are supplied by a phase inversion device (6) in the form of a valve or similar. Water can expediently be added to the fluid upstream of the phase inversion device (6) to achieve the desired phase inversion.

12 Claims, 3 Drawing Sheets

METHOD AND DEVICE FOR SEPARATION OF A FLUID, IN PARTICULAR OIL, GAS AND WATER

FIELD OF THE INVENTION

The present invention concerns a method for separation of a fluid, in particular oil, gas and water, in connection with the extraction of such a fluid from formations under the surface of the earth or the sea bed, comprising a separator in the form of a tubular separator body, a gravitation tank or similar.

BACKGROUND OF THE INVENTION

The applicant's own Norwegian patent application nos. 19994244, 20015048, 20016216, 20020619 and 20023919 describe prior art pipe separators for the separation of oil, water and/or gas downhole, on the sea bed or on the surface, on a platform or similar, in which various system solutions are used, comprising combinations and pipe separators and other separation equipment, that have contributed to a significant development of separation technology, in particular for the separation of oil and water.

During tests, among other things in connection with the development of the above patented solutions, it emerged, however, as will be explained in further detail later, that it is possible to improve oil/water separation in certain situations by adding water to the oil/water fluid prior to separation. Moreover, it emerged that, by subjecting the fluid to shear forces prior to separation, faster phase inversion can be achieved, i.e. a faster transition from the initial fluid, consisting of a mixture of water dispersed in an oil phase, to separate layers of water and oil.

SUMMARY OF THE INVENTION

Against this background, the method in accordance with the present invention is characterised in that the fluid upstream of the separator is subjected to shear forces so that the drops in the supply flow are torn up into such small drops that the interface generally becomes new and "uncontaminated" by surfactants.

A device in accordance with the present invention is characterised in that a phase inversion device, in the form of a valve or similar, is arranged in the transport pipe upstream of the separator.

BRIEF DESCRIPTION OF THE DRAWINGS

The present invention will be described in further detail in the following by means of examples and with reference to figures, where:

FIG. 2 shows the same as in FIG. 1 but a device has been inserted upstream of the separator that subjects the fluid to shear forces, for example a suitable valve or similar.

DETAILED DESCRIPTION OF THE PREFERRED EMBODIMENTS

Figure 1:
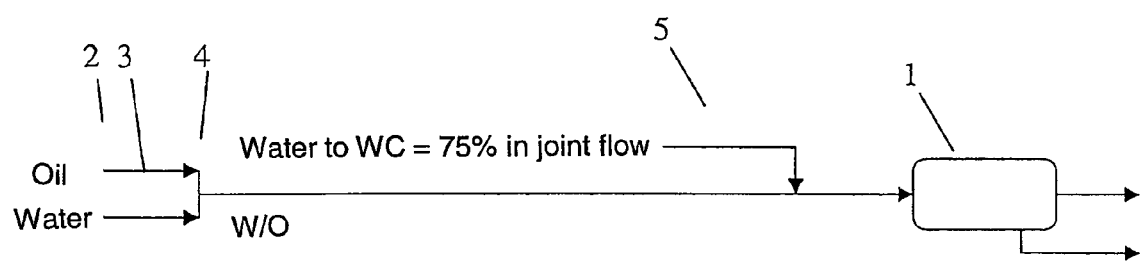
FIG. 1 shows a simple sketch of an equipment setup with pipes for oil and water that converge to form one fluid pipe in which oil and water are mixed. The fluid pipes are connected to a gravitation separator.

As stated above, FIG. 1 shows a simple sketch of a test setup in which water and oil are passed through pipes 2, 3, mixed in a mixing device 4 (which may be a throttle valve or a mixing pipe) and transported on as one fluid to a separator 1 in the form of a conventional gravitation separator designed as a cylindrical tank. Upstream of the separator 1 there is a supply pipe 5 for the supply of water.

In principle, therefore, it is theoretically possible to improve oil/water separation of fluids by adding water and thus increasing the water cut to, for example, 70-75%, whereby the fluid must be water-continuous.

When this was done by adding water directly to the fluid as shown in the figure, the tests showed that the effect was unstable and unreliable, as no positive effect was generally achieved.

Figure 3:
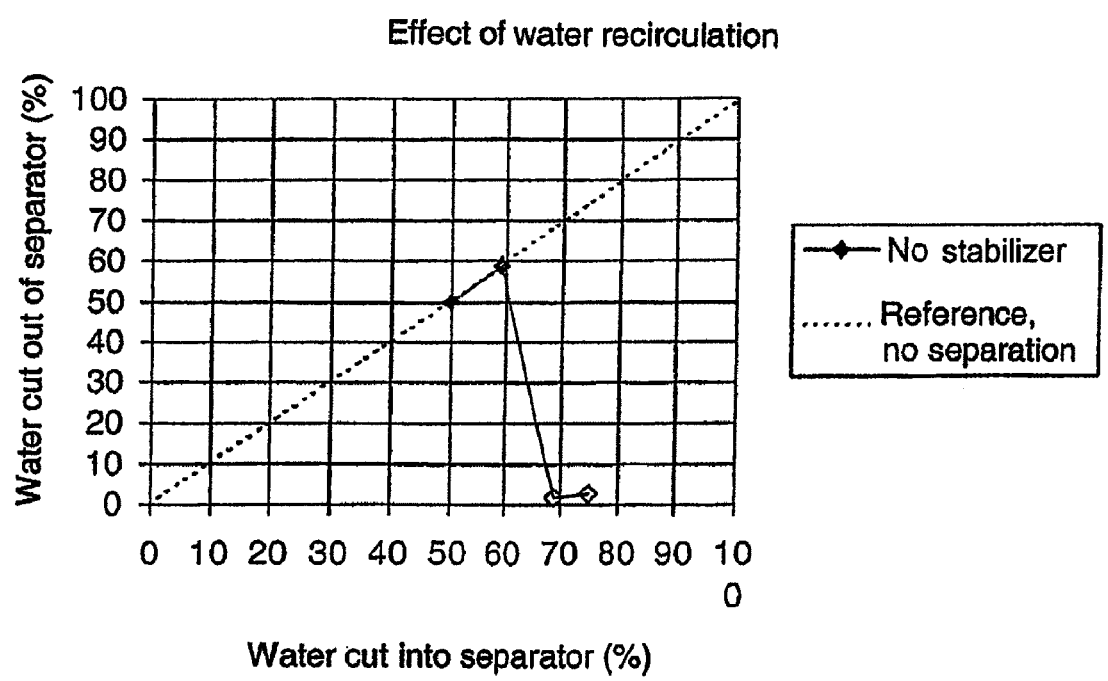
FIG. 3 is a diagram showing the effect of water recirculation comparing water cut in oil in % out of the separator with the water cut in the oil in % into the separator before adding mixture of water up to 75%.

The diagram of FIG. 3 shows the effect of water recirculation by comparing the water cut in the oil in % out of the separator with the water cut in the oil in % into the separator before admixture of water up to 75%.

The diagram shows that, when the original flow is oil-continuous (<=60% WC (WC=water cut)), no significant separation is achieved even if water is added to a total water cut of 75%. If the original flow is water-continuous (WC>60%), the separation is fast and effective, as expected for water-continuous systems. At 75% original water cut, the fluid separates down to an outgoing water cut of around 2%. All of the points in the diagram are referred to 75% total water cut after adding "recirculated water".

Figure 2:
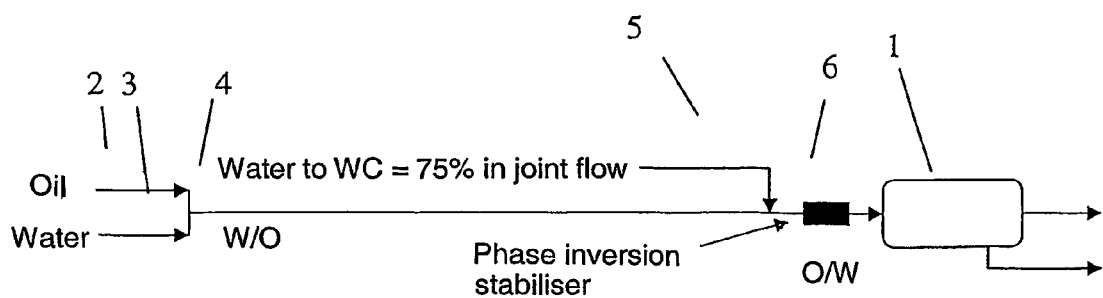
Figure 4:
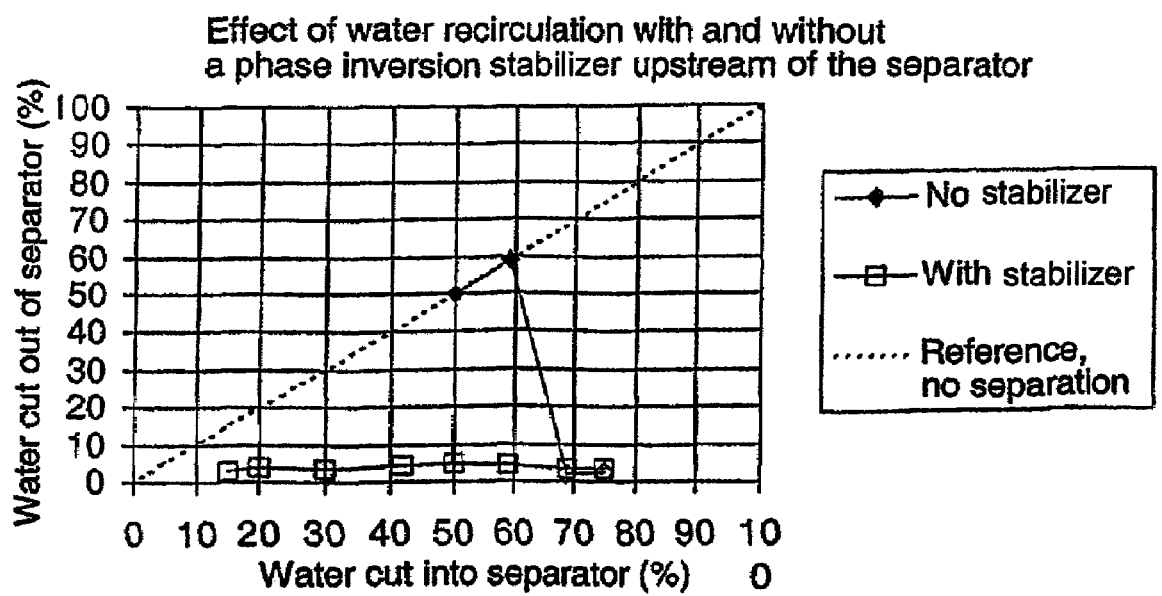
FIG. 4 is a diagram that shows the effect of water recirculation by comparing the water cut in the oil in % out of the separator with the water cut in the oil in % into the separator with and without a liquid phase immersion stabilizer.

When a device (called a phase inversion stabilizer in the following) in the form of a valve or similar 6 that subjects the fluid to shear forces was inserted in the transport pipe 4 upstream of the separator 1 as shown in FIG. 2, the effect of recirculated water on oil/water separation proved to be stable and reliable. The diagram of FIG. 4 shows the effect of water recirculation by comparing the water cut in the oil in % out of the separator with the water cut in the oil in % into the separator, with and without the liquid phase inversion stabilizer 6. As the diagram shows, a water cut out of the separator lower than approximately 5% was achieved in the entire water cut range of the original fluid (15% to 75% WC).

The phase inversion stabilizer is a unit that subjects the fluid to shear forces. The most important criteria and functions of the unit are that:

1. The shear forces must be high enough to ensure that the drops in the supply flow are torn up to form drops that are so small that the interface generally becomes new and "uncontaminated" by the surfactants that are always present in crude oil systems. The new interface is therefore very unstable and the drops will begin a strong, intense coalescence process that leads to phase inversion.
2. When a large drop is torn up into smaller drops, the surface area between the oil and the water will increase. When torn up to just a third of the original diameter, the new drops will be unstable and the "phase inversion stabilizer" will have an effect.
3. The typical operation parameter will be to tear up the original drops to around less than 10% of the original drop diameter. This produces a stable phase inversion process.

The simplest practical design of the "phase inversion stabilizer" is as a sharp-edged valve (ball valve or similar). If the average drop size in the transport pipe upstream of the phase inversion stabilizer is around 1000 μm, a pressure drop over the valve of around 1 to 1.5 bar will be more than sufficient for stable phase inversion.

The present invention as it is defined in the claims is not limited to the examples shown in the figures and described above. Some crude oils may, for instance, be oil-continuous with 70-80% water cut during the transport of crude oil through pipes. Such flows can also be made water-continuous by means of the phase inversion stabilizer. The requirement is that the water cut in the oil is sufficiently high for a system to remain water-continuous when it has been phase-inverted. The addition of de-emulsifier can prevent the phase-inverted fluid from inverting back to being oil-continuous.

The invention claimed is:

1. A method for separation of a fluid comprising oil and water, in connection with extraction of such a fluid containing drops of water in oil or oil in water from formations under earth's surface or sea bed, in which the fluid is transported in a supply pipe or transport pipe to a separator, and wherein separated water and oil are passed out of the separator separately via outlet pipes, wherein the fluid, when upstream of the separator, is subjected to shear forces so that drops in the fluid are torn up to form new drops that have a diameter that is less than a third of their original diameter and are so small that an interface of the drops generally becomes new and uncontaminated by said surfactants, wherein the shear forces are supplied by a phase inversion stabilizer, and begin a coalescence process that leads to phase inversion, and separated water is recirculated from said separator to said fluid upstream of said phase inversion stabilizer, to lower a water cut in the oil passing out of said separator.

2. A method as claimed in claim 1, wherein the phase inversion device is in the form of a valve.

3. A method as claimed in claim 1, wherein de-emulsifier is added to the fluid before or after the fluid has passed through the phase inversion stabilizer to prevent the fluid from inverting back to oil-continuous fluid after having passed through the phase inversion stabilizer.

4. A method as claimed in claim 1, wherein the separator is in the form of a tubular separator body or a gravitation tank.

5. A method as claimed in claim 1, wherein the new drops have a diameter that is less than 10% of their original diameter.

6. A method as claimed in claim 1, wherein the fluid contains drops of oil in water.

7. A method for separation of a fluid that comprises surfactants, oil and water, the fluid being extracted from under earth's surface or sea bed, and the fluid containing drops of water in oil or drops of oil in water, said method comprising:

transporting the fluid in a supply pipe or transport pipe to a separator and separating oil of the fluid from water of the fluid in the separator;

passing separated oil and water out of the separator via separate outlet pipes;

subjecting the fluid, upstream of the separator, to shear forces such that the drops of water in oil or the drops of oil in water are torn up to form new drops that have a diameter less than a third of their original diameter and are so small that an interface of the new drops generally becomes new and uncontaminated by said surfactants, wherein the shear forces are supplied by a phase inversion stabilizer, and begin a coalescence process that leads to phase inversion, and separated water is recirculated from said separator to said fluid upstream of said phase inversion stabilizer, to lower a water cut in the oil passing out of said separator.

8. The method of claim 7, wherein the phase inversion stabilizer comprises a valve.

9. The method of claim 7, further comprising adding a de-emulsifier to the fluid either before or after the fluid has passed through the phase inversion stabilizer to prevent the fluid from inverting back to an oil-continuous fluid after having passed through the phase inversion stabilizer.

10. The method of claim 7, wherein the separator comprises a tubular separator body or a gravitation tank.

11. The method of claim 7, wherein the new drops have a diameter that is less than 10% of their original diameter.

12. The method of claim 7, wherein the fluid contains drops of oil in water.

* * * * *

UNITED STATES PATENT AND TRADEMARK OFFICE
CERTIFICATE OF CORRECTION

| | |
|---|---|
| PATENT NO. | : 7,611,633 B2 |
| APPLICATION NO. | : 10/563358 |
| DATED | : November 3, 2009 |
| INVENTOR(S) | : Per Gramme et al. |

It is certified that error appears in the above-identified patent and that said Letters Patent is hereby corrected as shown below:

In column 3, line 19, claim 1, the phrase "A method for separation of a fluid comprising oil and" should read -- A method for separation of a fluid comprising surfactants, oil and --.

Signed and Sealed this

Twenty-fourth Day of August, 2010

David J. Kappos
*Director of the United States Patent and Trademark Office*